US009854945B2

(12) United States Patent
Starflinger

(10) Patent No.: US 9,854,945 B2
(45) Date of Patent: Jan. 2, 2018

(54) KITCHEN MACHINE

(71) Applicant: Vorwerk & Co. Interholding GmbH, Wuppertal (DE)

(72) Inventor: Frank Starflinger, Bochum (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 113 days.

(21) Appl. No.: 14/923,674

(22) Filed: Oct. 27, 2015

(65) Prior Publication Data
US 2016/0120370 A1 May 5, 2016

(30) Foreign Application Priority Data
Oct. 29, 2014 (DE) .................. 10 2014 115 744

(51) Int. Cl.
*A47J 43/046* (2006.01)
*A47J 43/07* (2006.01)

(52) U.S. Cl.
CPC ......... *A47J 43/0772* (2013.01); *A47J 43/046* (2013.01); *A47J 43/0716* (2013.01); *A47J 43/0777* (2013.01)

(58) Field of Classification Search
CPC ............... A47J 43/046; A47J 43/0772
USPC .......... 241/37.5, 282.1, 282.2; 366/205, 206, 366/314
See application file for complete search history.

(56) References Cited

U.S. PATENT DOCUMENTS 4,174,073 A * 11/1979 Maher ............ A47J 43/046 241/282.1
7,047,872 B2 * 5/2006 Mulle ............. A47J 43/0788 241/37.5
2005/0056160 A1 3/2005 Mulle

FOREIGN PATENT DOCUMENTS

DE 10 2011 051 151 A1 12/2012
EP 0 046 169 A1 2/1982
EP 2 698 088 A1 2/2014
EP 2 987 438 A1 2/2016
FR 2 791 546 B1 10/2000
WO 2005/120317 A1 12/2005

OTHER PUBLICATIONS

European Search Report dated Mar. 21, 2016 in European Application No. 15 18 9274 with English translation of the relevant parts.

* cited by examiner

*Primary Examiner* — David Sorkin
(74) *Attorney, Agent, or Firm* — Collard & Roe, P.C.

(57) ABSTRACT

The invention relates to a kitchen appliance (1), in particular a mixer having a base device (2) and a vessel (3), which can be arranged thereon, wherein the kitchen appliance (1) has a positioning device (8) for positioning a first partial area (6) of the kitchen appliance (1) relative to a second partial area (7) of the kitchen appliance (1). For an advantageous monitoring of a positioning, it is proposed for an optical measuring device comprising a light emitter (9) and a light receiver (10) to be assigned to the positioning device (8), which are arranged on the first partial area (6) and/or on the second partial area (7) in such a manner that the light intensity measured by the light receiver (10) varies as a function of the positioning of the first partial area (6) relative to the second partial area (7).

8 Claims, 3 Drawing Sheets

KITCHEN MACHINE

CROSS REFERENCE TO RELATED APPLICATIONS

Figure 1:
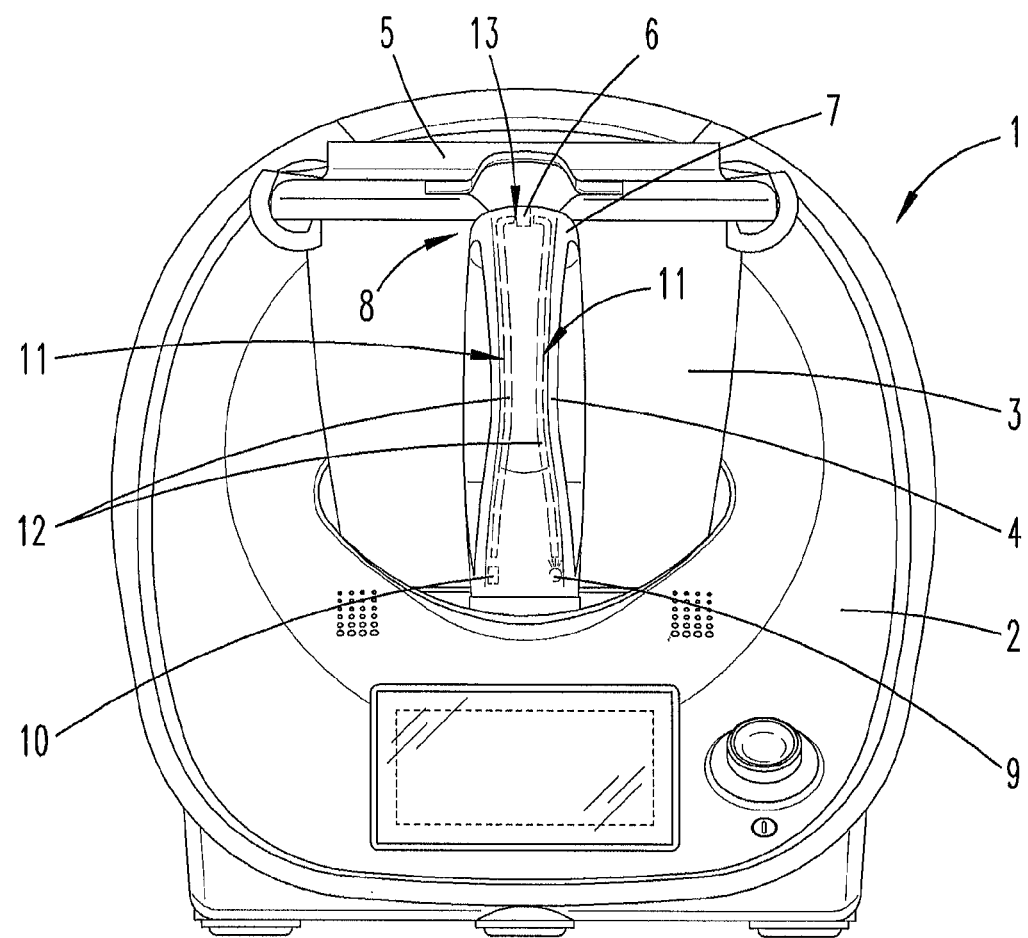

Applicant claims priority under 35 U.S.C. §119 of German Application No. 10 2014 115 744.3 filed on Oct. 29, 2014, the disclosure of which is incorporated by reference.

The invention relates to a kitchen appliance, in particular a mixer having a base device and a vessel, which can be arranged thereon, wherein the kitchen appliance has a positioning device for positioning a first partial area of the kitchen appliance relative to a second partial area of the kitchen appliance.

Kitchen appliances comprising positioning devices are known in the prior art. They serve the purpose, for example, of positioning a lid relative to a vessel in such a manner that the best possible closure can be attained between vessel and lid. Likewise, positioning devices for positioning the vessel relative to the base device exist as well.

Kitchen appliances, for example, in the case of which the positioning device has first and second partial areas, which correspond in a positive manner, on the base device and on the vessel or on the vessel and on the lid, respectively, are known. In response to a positioning, the first and the second partial area are brought into the desired position either manually by the user of the kitchen appliance or by means of the weight of the vessel or of the lid, respectively.

Publication EP 2 698 088 A1 discloses a kitchen appliance, for example, comprising a cooking vessel and a lid for the cooking vessel, wherein the lid can be locked against the cooking vessel in a locked position. The wall of the vessel has a radially protruding vessel edge, on which a lid edge can be arranged. A locking part of the kitchen appliance, which can be displaced from a released position into a locked position for locking vessel and lid, is assigned to the vessel edge and to the lid edge. If the lid is not arranged in a suitable position relative to the vessel so as to attain an optimal locking, the locking part pulls or pushes, respectively, the lid into the position, which is required for the locking. In this context, the lid is a first partial area of the kitchen appliance, while the vessel represents a second partial area of the kitchen appliance.

In the alternative, the vessel can also be a first partial area of the kitchen appliance, while a vessel receptacle represents the second partial area of the kitchen appliance. A part, such as a scale or a storage container, for example, which can be coupled to the kitchen appliance, if necessary, can also be a first partial area of the kitchen appliance, while a corresponding receptacle for holding the scale or the storage container forms the second partial area of the kitchen appliance.

The problem of the afore-mentioned positioning devices is that the quality of the closure of vessel and lid, for example, is determined by the accuracy of the engagement of the first and second partial area. Accordingly, a more or less tight locking of vessel and lid can occur. The positioning of such partial areas relative to one another, however, is desired to be as precise as possible, so as to be able to carry out subsequent functions, such as, for example, the locking of a lid on a vessel or the locking of a scale to the vessel or an introduction of media into a coupled vessel, in an unhindered and reproducible manner, if possible.

It is thus the object of the instant invention to create an advantageous monitoring for a positioning of a first partial area of the kitchen appliance relative to a second partial area of the kitchen appliance.

To solve the afore-mentioned object, a kitchen appliance is proposed, in the case of which an optical measuring device comprising a light emitter and a light receiver is assigned to the positioning device, which are arranged on the first partial area and/or on the second partial area in such a manner that the light intensity measured by the light receiver varies as a function of the positioning of the first partial area relative to the second partial area.

According to the invention, a positioning of the first partial area relative to the second partial area of the kitchen appliance does not only take place in a purely mechanical manner in that the partial areas, which correspond in a positive manner, are positioned relative to one another solely based on their shape and weight, for example. In fact, the positioning of the partial areas is now controlled or reviewed, respectively, by means of an optical measuring device. The optical measuring device works in such a manner that the light intensity measured by means of the light receiver is evaluated as measure for the positioning success of the two partial areas. In the event that the first partial area was positioned relative to the second partial area in a position, which is optimal for the locking, the measured light intensity can approach zero, for example, or, in the alternative—depending on the concrete arrangement and embodiment of the optical measuring device—can have a maximum value. The light emitter and the light receiver can interact in the context of a light barrier arrangement (e.g. through-beam sensor, retroreflective sensor) or in the context of an optical distance measuring device, for example. An improved positioning success, as compared to the positioning devices known from the prior art can be attained by using an optical measuring device to review the relative positioning of the first and second partial area. A more accurate positioning of vessel and lid, for example, can thus be created, whereby the tightness of the connection is also increased at the same time. In addition, it is advantageous thereby that the quality of the positioning can be detected directly by means of the measured light intensity.

Provision is made for the second partial area to be a partial area of the vessel, in particular of a handle of the vessel. According to this embodiment alternative, the vessel is that part of the kitchen appliance, on which a first partial area is oriented. In particular the handle of vessel thus advantageously serves as second partial area, because the latter can be recognized particularly easily by the user and thus lends itself as optical (and also as haptic) marker. Due to its relatively arbitrary shape, the handle can also receive the optical measuring, device or at least parts of the optical measuring device in an exceptional manner.

Provision is made for the light emitter and/or the light receiver to be arranged on the second partial area. It is advantageous in particular that the light emitter as well as the light receiver are arranged in the same partial area of the kitchen appliance, for example the handle of the vessel, so that only a single electric line is required. The optical measuring device as a whole can thus be embodied and can be implemented in the kitchen appliance in a particularly cost-efficient manner. The optical measuring device can be embodied as retroreflective sensor, for example, in such a manner that a light emitter arranged on the second partial area shines light into the first partial area of the kitchen appliance, in response to which at least a part of the light is reflected from the first partial area back to the light receiver arranged on the second partial area in response to an optimal positioning of the first partial area relative to the second partial area. It is advisable for a mirror-coating to be applied to the first partial area least in the incident area of the light.

In contrast, the light emitted by the light emitter is not reflected at all on the partial area or only a very small part thereof is reflected in response to an insufficient positioning of first and second partial area, so that the light path embodied between light emitter and light receiver is interrupted and the light receiver can thus not measure any or only a slight light intensity. As a function of the measured value of the light receiver, a conclusion can thus be drawn as to whether or not the first partial area had been positioned optimally to the second partial area.

Other measuring arrangements are also possible as alternative to an embodiment of the optical measuring device as light barrier. For example, the light emitter and the light receiver can also be components of an optical distance measuring device, wherein the light emitter is arranged on the first partial area and the light receiver is arranged on the second partial area, for example. A conclusion can then be drawn to the correct positioning of the first partial area to the second partial area as a function of the measured distance between the light emitter and the light receiver.

It is proposed for the first partial area to be a partial area of a lid, which closes the vessel. According to this embodiment, the lid is positioned relative to a second partial area, preferably the vessel. Advantageously, the lid can be quipped, for example, with a ring, which runs along the circumference thereof, or, in the alternative, with a radially oriented fin, which has the effect that the light path between the light emitter and the light receiver is interrupted in response to an optimal positioning of the lid relative to the vessel.

Provision is made for the first partial area or the second partial area to be capable of engaging with the light path in such a manner that the light intensity measured by the light receiver varies. As explained above, the light path can be the light path of a light barrier arrangement, for example. The light barrier arrangement can be embodied as through-beam sensor or retroreflective sensor.

In the case of a through-beam sensor, the light emitter can be arranged on a different partial area of the kitchen appliance than the light receiver, for example. For example, the light emitter can be arranged in the area of the vessel, while the light receiver is arranged in the area of the lid. If the lid is then not positioned correctly to the vessel, for example to the handle thereof, the light receiver detects a light intensity, so that a conclusion can be drawn that the lid is not positioned properly. If the lid has reached the proper position, the light path of the light barrier is interrupted, so that the light receiver does not detect a light intensity any longer.

In the alternative, the light path can be the light path of a retroreflective sensor. Both the light emitter and the light receiver are arranged together either on the first partial area of the kitchen appliance or on the second partial area of the kitchen appliance in this case. In response to an optimal positioning of first and second partial area, the partial area, which has neither the light emitter nor the light receiver, serves as reflection face, which can reflect the light emitted by the light emitter, so that said light can be measured by the light receiver. If first and second partial area are not oriented relative to one another as desired, the light emitted by the light emitter is not reflected back to the light receiver. In the alternative, it is also possible for the engagement of the partial area with the light path to result in a shielding of the light from a mirror-coated surface, so that the light cannot be reflected back and so that the light intensity measured by the light receiver thus approaches zero. As a result, a conclusion can be drawn to the correct positioning.

It is proposed for the light path to be provided by means of at least one light guide, in particular an optical fiber, wherein an opening gap, with which the first partial area or the second partial area can engage, is assigned to the light guide. According to this embodiment, the light emitted by the light emitter is coupled into a light guide and is then guided inside the light guide, so that a light scattering, which occurs on the light path, can be reduced. In particular, the emitted light propagates through the light guide in a focused manner, so that the light intensity does not change significantly across the length of the light guide. Lenses can be arranged in the area of the inlet or outlet openings, respectively, of the light guide or of the light guides, respectively, so as to couple the light emitted by the light emitter into or out of the light conductor, respectively, with particularly low loss. Preferably, an opening gap, with which a first partial area or second partial area of the kitchen appliance can engage, is preferably assigned to the light guide. The opening gap can be arranged downstream from the outlet opening of the light guide, for example. As soon as the first partial area engages with guide, for example. As soon as the first partial area engages with the opening gap embodied between light guide and second partial area, for example, the light path is interrupted, so that the light receiver can no longer receive light. As a result, a conclusion can be drawn to the presence of the first partial area in the desired position.

In a particularly advantageous manner, the light path can be provided by two light guides, which have a common optical axis and which are spaced apart from one another by means of the opening gap. On principle, the two light guides can thereby be arranged in the same partial area of the kitchen appliance as well as in different partial areas. If a first light guide is arranged in the first partial area and a second light guide is arranged in the second partial area, for example, the opening gap can be formed by means of the gap, which is already formed between the first partial area and the second partial area. If, in contrast, both light guides are arranged in the same partial area of the kitchen appliance, for example in the handle of a vessel, this partial area can have a material recess, which separates the two light guides from one another and which thus embodies the opening gap.

As an alternative to the arrangement of one or a plurality of light guides, provision can be made for the light path to be provided by a wall of the first partial area or of the second partial area, which reflects the light emitted by the light emitter, wherein an opening gap, with which the second partial area or the first partial area can engage, is assigned to the wall. According to this embodiment, the light path is provided by a mirror coating of the wall of the first and/or second partial area of the kitchen appliance. For example, the handle arranged on the vessel, can have a duct-shaped cavity, the wall of which is mirror-coated, so that the light emitted by the light emitter—depending on the entrance angle thereof into the cavity—can be reflected and can thus reach the light receiver. According to this embodiment, a corresponding partial area of the lid can also engage with an opening gap embodied in the handle, whereby the desired optimal positioning of lid and vessel can be detected.

Finally, it is proposed for the kitchen appliance to have an automatic locking device, which is embodied to establish a lock between the first partial area and the second partial area of the kitchen appliance, in particular the vessel and the lid, as a function of the light intensity measured by means of the light receiver. According to this embodiment, the two partial areas are locked automatically in response to a desired correct positioning of the first and second partial area relative to one another. In this context, the light signal detected by the light receiver is also a signal for locking the two partial areas. As a result, the user of the kitchen appliance needs to make fewer hand movements than is common in the prior art to date for locking or for example a locking of the lid with the vessel, receptively. A separate touch of a button is no longer required, it is sufficient to position the two partial areas relative to one another correctly. Handling and operation of the kitchen appliance as a whole are thus designed in a particularly simple manner.

Figure 2:
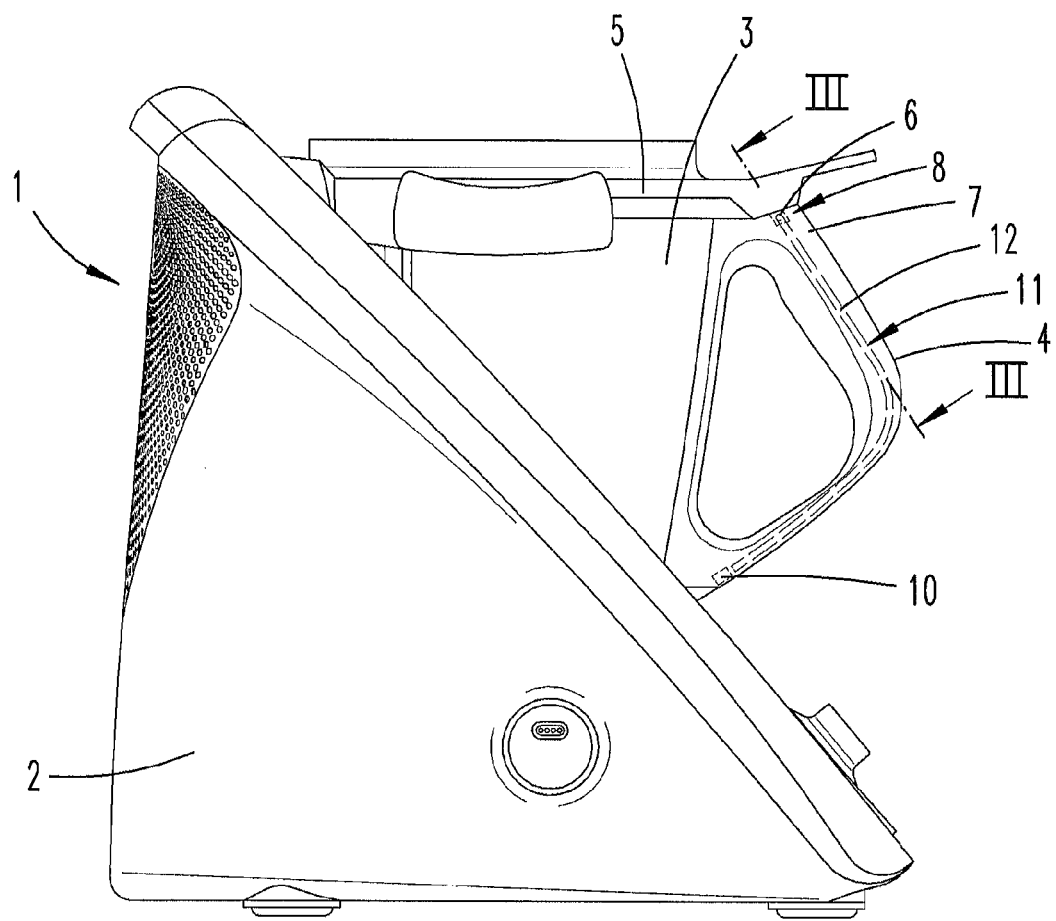
Figure 3:
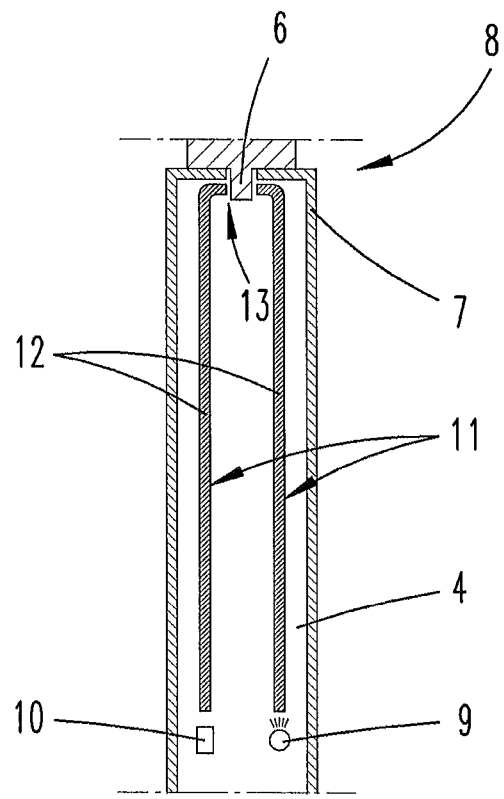

The invention will be specified in more detail below by means of an exemplary embodiment:

FIG. 1 shows a kitchen appliance according to the invention comprising an optical measuring device in a first view, FIG. 2 shows the kitchen appliance shown in FIG. 1 in a second view, FIG. 3 shows the optical measuring device shown in FIGS. 1 and 2 in a detailed view.

The illustrated kitchen appliance 1 has a base device 2 as well as a vessel 3 arranged on the base device 2. The vessel 3 has a handle 4 and is closed by means of a lid 5. A first partial area 6, which engages with a second partial area 7 arranged on the handle 4, is embodied on the lid 5. The first partial area 6 and the second partial area 7, which corresponds thereto in a positive manner, form a positioning device 8. A light emitter 9 as well as a light receiver 10 are furthermore assigned to the positioning device 8. The light emitter 9 and the light receiver 10 are elements of the optical measuring device.

An optical light path 11, along which the light emitted by the light emitter 9 propagates in the direction of the light receiver 10, is embodied between the light emitter 9 and the light receiver 10. According to this exemplary embodiment, the light path 11 has two light guides 12, which have a common optical axis and which are spaced apart from one another by means of an opening gap 13. The two light guides 12 are in each case shaped in an L-shaped manner, wherein the short sides are arranged relative to one another in such a manner that the two light guides 12 as a whole form a U-shape. The opening gap 13 is arranged in the short side of the "U". The opening gap 13 is positioned and dimensioned in such a manner that the corresponding first partial area 6 of the lid 5 can engage with the opening gap 13. The end areas of the light guides 12, which face away from the opening gap 13, have the light emitter 9 on the one hand and the light receiver 10 on the other hand.

The optical measuring device can be gathered in detail from FIG. 3. The measuring device is embodied according to the principle of a light barrier. A first partial area 6 can engage with the light path 11, which is embodied by the two light guides 12, so that the light emitted by the light emitter 9 cannot reach the light receiver 10.

The invention works in such a manner that the user of the kitchen appliance 1 arranges the vessel 3 on the base device 2. A lid 5 is arranged on the vessel 3 to close the vessel 3, which is open on the top. If the lid 5 is oriented relative to the vessel 3 in such a manner that the first partial area 6 embodied on the lid 5 engages optimally with the second partial area 7 arranged on the handle 4 of the vessel 3, lid 5 and vessel 3 can be locked with one another in such a manner that the vessel 3 is closed, in particular in a fluid-tight manner.

It can be verified by means of the optical measuring device, whether the first partial area 6 and the second partial area 7 are positioned optimally to one, another, so that a locking can be carried out successfully.

The optical measuring device works in such a manner that the light emitter 9 emits light, which is coupled into a light guide 12, which is adjacent to the light emitter 9. For the purpose of coupling in, a lens can be arranged on the inlet opening of the light guide 12. The light emitted by the light emitter 9 propagates inside the light guide 12 towards the outlet opening and escapes from the light guide 12 at that location—in the area of the opening gap 13. The light couples into the second light guide 12 downstream from the opening gap 13 and propagates all the way to the light receiver 10, which is arranged in the area of the outlet opening of the second light guide 12.

If the user has arranged the lid 5 on the vessel 3 properly, the first partial area 6 of the lid 5 engages with the second partial area 7, which is arranged on the handle 4 of the vessel 3, concretely with the opening gap 13 of the light path 11. As a result, the light path 11 is interrupted, so that the light emitted by the light sensor 9 cannot reach the light receiver 10. As a result, the light intensity measured by the light receiver 10 decreases to zero. A conclusion can thus be drawn to the fact that the lid 5 is arranged on the vessel 3 correctly.

Information relating to the correct positioning can thereupon be sent to a locking device arranged on the kitchen appliance 1. This locking device can then carry out an automatic locking between the first partial area 6 and the second partial area 7, namely the vessel 3 and the lid 5.

REFERENCE LIST

1 kitchen appliance
2 base device
3 vessel
4 handle
5 lid
6 first partial area
7 second partial area
8 positioning device
9 light emitter
10 light receiver
11 light path
12 light guide
13 opening gap

The invention claimed is:

1. A kitchen appliance comprising:
   a positioning device comprising a first partial area and a second partial area, the positioning device being configured to position the first partial area relative to the second partial area; and
   an optical measuring device assigned to the positioning device and comprising a light emitter, a light receiver, a first light guide, a second light guide, and an opening gap, the light emitter and the light receiver being arranged on the first partial area or on the second partial area in such a manner that the light intensity measured by the light receiver varies as a function of the positioning of the first partial area relative to the second partial area,
   wherein the first light guide and the second light guide form together a light path arranged between the light emitter and the light receiver, have a common optical axis, and are spaced apart from one another by the opening gap, and
   wherein the second partial area or the first partial area can engage into the opening gap and interrupt light traveling through the light path such that the light intensity measured by the light receiver varies.

2. The kitchen appliance according to claim 1, wherein the kitchen appliance comprises a mixer having a base device and a vessel arranged on the base device, and
wherein the second partial area is a partial area of the vessel.

3. The kitchen appliance according to claim 1, wherein the light emitter and the light receiver are arranged on the second partial area.

4. The kitchen appliance according to claim 2, wherein the first partial area is a partial area of a lid, which closes the vessel.

5. The kitchen appliance according to claim 1, wherein each of the first and second light guides comprises an optical fiber.

6. The kitchen appliance according to claim 1, wherein the light path is provided by a wall of the first partial area or of the second partial area, the wall reflecting the light emitted by the light emitter, and
wherein the opening gap is assigned to the wall.

7. The kitchen appliance according to claim 4, wherein the first partial area is embodied in such a manner that the first partial area can engage with the opening gap as a result of the arrangement of the lid on the vessel.

8. The kitchen appliance according to claim 1, comprising an automatic locking device, which is embodied to establish a lock between the first partial area and the second partial area of the kitchen appliance, as a function of the light intensity measured by the light receiver.

* * * * *